United States Patent [19]

Okada et al.

[11] Patent Number: 5,717,591
[45] Date of Patent: Feb. 10, 1998

[54] TURN BEHAVIOR CONTROL SYSTEM OF VEHICLE ADAPTABLE TO EXTERNAL CONDITIONS

[75] Inventors: Akio Okada, Mishima; Masatoshi Yoneyama, Susono, both of Japan

[73] Assignee: Toyota Jidosha Kabushiki Kaisha, Aichi-ken, Japan

[21] Appl. No.: 521,427

[22] Filed: Aug. 30, 1995

[30] Foreign Application Priority Data

Sep. 13, 1994 [JP] Japan ................... 6-244700

[51] Int. Cl.⁶ .................................................. B60K 28/16
[52] U.S. Cl. .................. 364/426.027; 364/426.01; 364/426.016; 180/197; 303/139; 303/163
[58] Field of Search ............ 364/426.03, 426.015, 364/426.016, 426.017, 426.027; 180/197, 415, 422; 303/141, 146, 163, 139, 140

[56] References Cited

U.S. PATENT DOCUMENTS

| | | | |
|---|---|---|---|
| 4,690,431 | 9/1987 | Ito et al. | 280/771 |
| 4,898,431 | 2/1990 | Karnopp et al. | 303/146 |
| 5,206,808 | 4/1993 | Inoue et al. | 364/426.016 |
| 5,267,783 | 12/1993 | Inoue et al. | 303/146 |
| 5,291,408 | 3/1994 | Thatcher | 364/426.03 |
| 5,504,680 | 4/1996 | Yamashita et al. | 180/197 |

FOREIGN PATENT DOCUMENTS

A-3-45453   2/1991   Japan .

*Primary Examiner*—Tan Q. Nguyen
*Attorney, Agent, or Firm*—Oliff & Berridge, P.L.C.

[57] ABSTRACT

A turn behavior control system continually modifies its control performance by itself so as to adapt itself to varying external conditions such as curving and surface conditions of the road and the driving skill of the driver, according to study of the turn behavior of the vehicle controlled thereby under the influence of those external conditions, such that an anti-spin moment is generated according to a spin parameter estimating the spinning condition of the vehicle when the spin parameter exceeds a standard value which is reviewed by each unit period to be lowered as the frequency of operation of the control system during the unit period increases or to be raised as the time based integration of the spin value during the unit period increases, or the anti-spin moment is increased as the friction coefficient of the road surface lowers.

7 Claims, 6 Drawing Sheets

ABSOLUTE VALUE OF SPIN VALUE SV

ABSOLUTE VALUE OF SPIN VALUE SV

FRICTION COEFFICIENT
OF ROAD SURFACE μ

TURN BEHAVIOR CONTROL SYSTEM OF VEHICLE ADAPTABLE TO EXTERNAL CONDITIONS

BACKGROUND OF THE INVENTION

1. Field of the Invention

The present invention relates to a turn behavior control system of a vehicle such as an automobile for suppressing undesirable turn behaviors such as drifting out or spinning which would occur during a turn driving of the vehicle, and more particularly, to a turn behavior control system for suppressing those undesirable turn behaviors with a variable performance automatically adapted to external conditions such as road conditions and driver's skill.

2. Description of the Prior Art

As a system for controlling the turn behavior of a vehicle such as an automobile during a turn driving, there is known a system which comprises a means for detecting steering angle, a means for detecting vehicle speed, a means for detecting yaw rate, a means for detecting tire grip limit vehicle speed in relation to the steering angle, a means for setting a target yaw rate based upon the steering angle and the tire grip limit vehicle speed, and braking means provided for respective vehicle wheels, and is adapted to control braking forces applied to the vehicle wheels at the inside and outside of the turn when the vehicle speed exceeds the tire grip limit vehicle speed such that the vehicle speed is decreased to the grip limit vehicle speed with the yaw rate being approached to the target yaw rate, as described in Japanese Patent Laid-open Publication 3-45453.

By employing such a turn behavior control system, the vehicle will be driven with an improved performance such that the tire grip limit is kept, while the yaw rate is also kept within the target yaw rate, whereby undesirable turn behaviors of the vehicle such as drifting out or spinning are effectively suppressed.

In the known behavior control system described in the above-mentioned publication, the behavior control is started with a constant threshold standard, such that the vehicle wheels are braked when the vehicle speed exceeds the tire grip limit vehicle speed.

By such a behavior control system, the behavior control is not carried out so as to reflect a great change of road conditions or the driving skill of each particular driver upon the performance of the control system.

Further, in the known system, the amount of behavior control is proportional to a yaw rate deviation, while it is not taken into consideration whether a current unstable behavior of the vehicle is growing or subsiding. Further, in the turn behavior control, the behavior of the vehicle often becomes unstable at the end of the control, as the anti-spin moment applied for the purpose of behavior control has an inertial effect, while if the gain of the turn behavior control is decreased to avoid such a problem, the responsiveness of the control is sacrificed.

SUMMARY OF THE INVENTION

In view of those and other various problems of the turn behavior control system of the above-mentioned publication and other known behavior control systems, it is the object of the present invention to provide a turn behavior control system which continually modifies operation performance thereof by itself so as to adapt itself to varying external conditions such as conditions of the road and the driving skill of the driver, according to study of the turn behavior of the vehicle controlled thereby under the influence of those external conditions.

According to an aspect of the present invention, the above-mentioned object is accomplished by a turn behavior control system of a vehicle, comprising a means for estimating a spinning condition of the vehicle based upon at least one operation parameter of the vehicle to generate a spin parameter, a means for generating an anti-spin moment in the vehicle, and a means for controlling said anti-spin moment generation means according to said spin parameter, wherein said control means starts operation of said anti-spin moment generation means when said spin parameter exceeds a threshold value therefor, with reviewing said threshold value by each unit period to be lowered as frequency of operation of said anti-spin moment generating means during a preceding unit period increases.

Conversely, as a matter of course, in the above-mentioned turn behavior control system, said threshold value may be reviewed by each unit period to be raised as the frequency of operation of said anti-spin moment generating means during a preceding unit period decreases.

According to another aspect of the present invention, the above-mentioned object is accomplished by a turn behavior control system of a vehicle, comprising a means for estimating a spinning condition of the vehicle based upon at least one operation parameter of the vehicle to generate a spin parameter, a means for generating an anti-spin moment in the vehicle, and a means for controlling said anti-spin moment generation means according to said spin parameter, wherein said control means starts operation of said anti-spin moment generation means when said spin parameter exceeds a threshold value therefor, with reviewing said threshold value by each unit period to be raised as an integration value of the absolute value of said spin parameter during a preceding unit period increases.

Conversely, as a matter of course, in the above-mentioned turn behavior control system, said threshold value may be reviewed by each unit period to be lowered as an integration value of the absolute value of said spin parameter during a preceding unit period decreases.

According to still another aspect of the present invention, the above-mentioned object is accomplished by a turn behavior control system of a vehicle, comprising a means for estimating a spinning condition of the vehicle based upon at least one operation parameter of the vehicle to generate a spin parameter, a means for generating an anti-spin moment in the vehicle, and a means for controlling said anti-spin moment generation means according to said spin parameter, wherein said control means controls operation of said anti-spin moment generation means so as to magnify the generation of said anti-spin moment according to increasing rate of said spin parameter.

Conversely, as a matter of course, in the above-mentioned turn behavior control system, said control means may control the operation of said anti-spin moment generation means so as to attenuate the generation of said anti-spin moment according to decreasing rate of said spin parameter.

BRIEF DESCRIPTION OF THE DRAWING

In the accompanying drawings.

DESCRIPTION OF THE PREFERRED EMBODIMENTS

In the following, the present invention will be described in more detail in the form of an embodiment with reference to the accompanying drawings.

Figure 1:
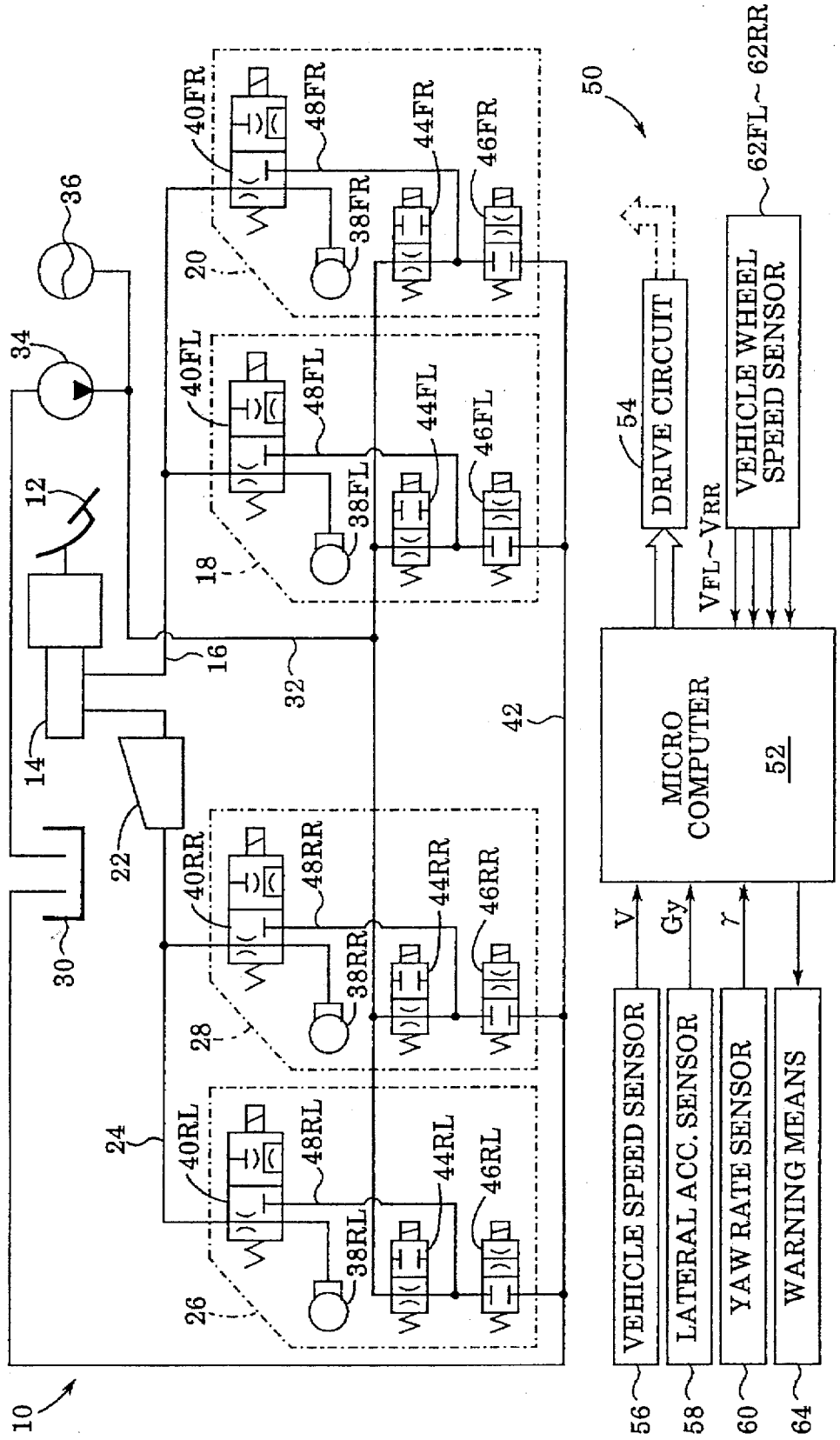
FIG. 1 is a diagrammatical view showing the fluid hydraulic circuit and the electric control means of an embodiment of the brake system according to the present invention.

Referring to FIG. 1, the brake system 10 includes a master cylinder 14 which delivers a brake working fluid under a pressure from first and second ports thereof in response to a stepping-on operation of a brake pedal 12 by a driver, the first port being connected to brake hydraulic pressure control means 18 and 20 for left and right front vehicle wheels through a pedal pressure passage 16, while the second port is connected to brake hydraulic pressure control means 26 and 28 for left and right rear vehicle wheels through a pedal pressure passage 24 including a proportional valve 22. The brake system 10 further includes a reservoir 30 and a pump 34 which pumps up and pressurizes the working fluid from the reservoir 30 to deliver it at an elevated pressure to a passage 32 connected to the brake hydraulic pressure control means 18, 20, 26 and 28 as described hereinbelow. An accumulator 36 is connected to the passage 32 so as to provide a high pressure source of the brake working fluid. Therefore, the passage 32 will be called an accumulator pressure passage.

The brake hydraulic pressure control means 18, 20, 26 and 28 include wheel cylinders 38FL, 38FR, 38RL and 38RR for generating braking forces applied to the corresponding front left, front right, rear left and rear right vehicle wheels, corresponding control valves 40FL, 40FR, 40RL and 40RR, and corresponding series connections of normally open type electromagnetic on-off valves 44FL, 44FR, 44RL and 44RR and normally closed type on-off valves 46FL, 46FR, 46RL and 46RR connected between the accumulator pressure passage 32 and a return passage 42 connected with the reservoir 30, wherein mid points between the respective series connections of said normally open type on-off valves and said normally closed type on-off valves are connected with corresponding ports of the control valves 40FL, 40FR, 40RL and 40RR by corresponding connection passages 48FL, 48FR, 48RL and 48RR, respectively.

The control valves 40FL and 40FR are changed over between respective first positions shown in the figure for connecting the wheel cylinders 38FL and 38FR of the front vehicle wheels with the pedal pressure control passage 16 while blocking the connection passages 48FL and 48FR and respective second positions for disconnecting the wheel cylinders 38FL and 38FR from the pedal pressure passage 16 while connecting the wheel cylinders 38FL and 38FR with the connection passages 48FL and 48FR, respectively. Similarly, the control valves 40RL and 40RR are respectively changed over between respective first positions shown in the figure for connecting the wheel cylinders 38RL and 38RR of the rear vehicle wheels with the pedal pressure passage 24 while blocking the connection passages 48RL and 48RR and respective second positions for disconnecting the wheel cylinders 38RL and 38RR from the pedal pressure passage 24 while connecting the wheel cylinders 38RL and 38RR with the connection passages 48RL and 48RR, respectively.

When the control valves 40FL, 40FR, 40RL and 40RR are changed over to said second position so that the wheel cylinders 38FL, 38FR, 38RL and 38RR are connected with the connection passages 48FL, 48FR, 48RL and 48RR, respectively, and when the on-off valves 44FL, 44FR, 44RL and 44RR are opened as shown in the figure, while the on-off valves 46FL, 46FR, 46RL and 46RR are closed as shown in the figure, the wheel cylinders 38FL-38RR are communicated with the accumulator pressure passage 32 through the connection passages 48FL-48RL and the on-off valves 44FL-44RR, so that the wheel cylinders are pressurized. When the control valves 40FL-40RR are also changed over to said second position, and when the on-off valves 44FL-44RR are closed, while the on-off valves 46FL-46RR are opened, the wheel cylinders 38FL-38RR are communicated with the return passage 42, so that the wheel cylinders 38FL-38RR are depressurized or exhausted. When the control valve 40FL-40RR are changed over to said second position, and when the on-off valve 44FL-44RR and the on-off valve 46FL-46RR are both closed, the wheel cylinders 38FL-38RR maintain the standing pressure.

Thus, when the control valves 40FL, 40FR, 40RL and 40RR are changed over to said first position, the brake system 10 operates to generate a braking force according to the depression of the brake pedal 12 by the driver, while when the control valves 40FL-40RR are changed over to said second position, the brake system 10 operates to generate a braking force according to an on/off control of the on-off valves 44FL-44RR and 46FL-46RR such that the braking forces applied to the respective vehicle wheels are controlled independently of the operation of the brake pedal 12.

The control valves 40FL-40RR, the on-off valves 44FL-44RR and the on-off valves 46FL-46RR are controlled by an electric control means 50 as described in detail hereinbelow. The electric control means 50 includes a microcomputer 52 and a drive circuit 54. Although not shown in detail in FIG. 1, the microcomputer 52 has a control processing unit (CPU), a read only memory (ROM), a random access memory (RAM), input and output means, and common bus means for bi-directionally interconnecting those elements, as in the conventional construction.

The input port means of the microcomputer 52 is supplied with a signal indicating vehicle speed V from a vehicle speed sensor 56, a signal indicating lateral acceleration Gy of the vehicle body from a lateral acceleration sensor 58 mounted substantially at the center of gravity of the vehicle body, a signal indicating yaw rate r of the vehicle body from a yaw rate sensor 60, and signals indicating vehicle wheel speeds Vfl, Vfr, Vrl and Vrr of the front left, front right, rear left and rear right vehicle wheels from corresponding vehicle wheel speed sensors 62FL-62RR. The lateral acceleration sensor 58 and others are adapted to deliver positive signals when the vehicle makes a left turn.

The ROM of the microcomputer 52 stores various control flows and maps as described hereinbelow, and CPU carries out various calculations based upon the parameters detected by the sensors to obtain a spin value SV as an estimation parameter of the turn behavior of the vehicle, to operate the hydraulic circuit so as to apply controlled braking forces to the vehicle wheels for the behavior control, and to output a warning signal through a warning means 64, when required.

In the following, the behavior control of the vehicle according to the shown embodiment will be described with reference to the flowchart shown in FIG. 2. The control according to the flowchart shown in FIG. 2 is started upon closing of an ignition switch not shown in the figure, and is repeated for each unit operation period at a determinate time interval.

Figure 2:
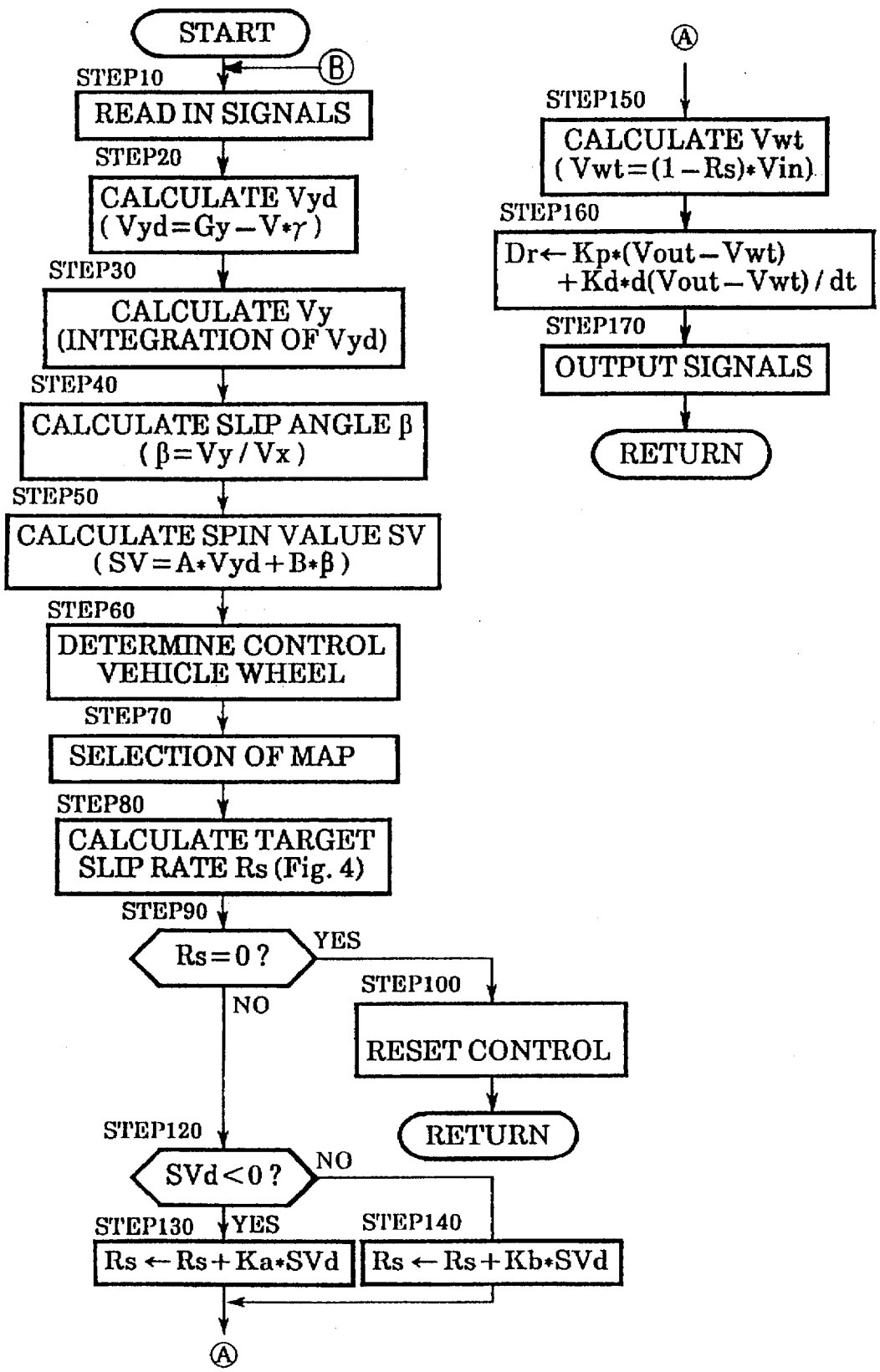
FIG. 2 is a flowchart showing the turn behavior control routine carried out according to an embodiment of the present invention.

Referring to FIG. 2, when the control is started, after the initialization as conventional, in step 10, the signal indicating vehicle speed V detected by the vehicle speed sensor 56 and other signals are read in, and then in step 20, lateral acceleration deviation Gy-V*r is calculated from lateral acceleration Gy and the product of vehicle speed V and yaw rate r. The lateral acceleration deviation is equivalent to side slide velocity Vyd of the vehicle body. Then, in step 30, the side slide velocity, or lateral acceleration deviation, Vyd is integrated to obtain lateral slide velocity Vy of the vehicle body, and then in step 40, slip angle β of the vehicle body is calculated as a ratio of lateral slide velocity Vy to longitudinal velocity Vx (=vehicle speed V), i.e. Vy/Vx, and then in step 50, spin value SV, a parameter to estimate the spinning condition of the vehicle, is calculated according to the below-mentioned formula I based upon the lateral acceleration deviation Vyd calculated in step 20 and the slip angle β calculated in step 40, wherein A and B are appropriate constants.

$$SV=A*Vyd+B*B \qquad (1)$$

The parameter to estimate the spinning condition of the vehicle may be defined in other ways. For example, it may be defined as a linear addition of slip angle β and slip angle velocity βd of the vehicle body.

In step 60, a control vehicle wheel, i.e. the vehicle wheel of which the braking force applied thereto is controlled for the turn behavior control according to the present invention, is determined. It is generally considered desirable that the control vehicle wheel is the front vehicle wheel at the outside of the turn, although other selections will be possible according to the construction parameters of the vehicles. In the following, it is assumed for the convenience of description that the control vehicle wheel is the front vehicle wheel at the outside of the turn in a turn driving of the vehicle. It is also assumed herein that, when the vehicle makes a left turn, i.e. when the control vehicle wheel is the front right vehicle wheel, the spin value SV is positive.

In step 70, according to the threshold spin value SVc determined by the threshold spin value control routine shown in FIG. 3 as described in detail below, a selection is made from the maps shown in FIG. 4, so that one of the performance curves (substantially composed of straight lines in the shown embodiment) is selected according to the value of SVc. Then in step 80, a target slip rate Rs is calculated according to the absolute value of the spin value SV by reference to the selected map of FIG. 4, said target slip rate Rs being a parameter substantially proportional to the deviation of the spin value SV from the threshold value thereof which triggers operation of the behavior control, as will be noted hereinbelow.

In step 90, it is tested if the target slip rate Rs is zero, whereby it is tested if the turn behavior of the vehicle is so stable in view of the current threshold value SVc that the turn behavior control is not yet required under the current conditions including the current external conditions, as will be noted below, and if the answer is yes, then in step 100, the control valves 40FL and 40FR for the front vehicle wheels are changed over to said first position (the control of braking for the rear vehicle wheels are not herein questioned for the purpose of convenience), so that the braking forces are controlled by the master cylinder 14 according to the depression of the brake pedal 12 by the driver. If the answer of step 90 is no, the control proceeds to step 120.

In step 120, a differentiation value SVd of the absolute value of the spin value SV is calculated and tested if it is negative, to know if the spinning condition is subsiding. If the answer is yes, then in step 130, the target slip rate RS is modified to be decreased based upon the differentiation value SVd (negative value) according to the below-mentioned formula 2, wherein Ka is a positive constant. In contrast, if the answer of step 120 is no, then in step 140, the target slip rate Rs is modified to be increased based upon the differentiation value SVd according to the below-mentioned formula 3, wherein Kb is also a positive constant. The factors Ka and Kb may be of the same value but may be appropriately varied from one another according to the performance of the control desired.

$$Rs=Rs+Ka*SVd \qquad (2)$$

$$Rs=Rs+Kb*SVd \qquad (3)$$

Figure 6:
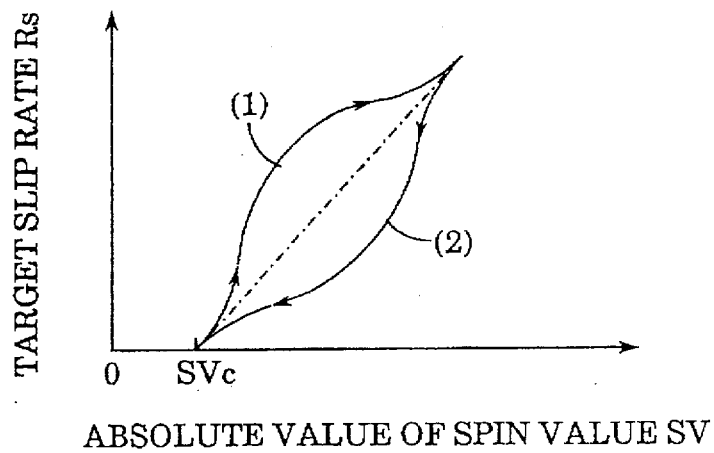
FIG. 6 is a graph showing an example of modifications of the relationship between the spin value and the target slip rate according to the differentiation spin value.

The differentiation value SVd reflects how quick the steering operation is made by the driver with respect to the magnitude thereof. Therefore, by modifying the target slip rate Rs based upon the differentiation value SVd according to the above formulae (2) or (3), the performance of the turn behavior control is modified to be more desirably adapted to the driver's skill of steering operation. Further details of the function of this parameter are described later with reference to FIGS. 6 and 8.

In step 150, based upon the vehicle wheel speed of the front vehicle wheel opposite to the control vehicle wheel, i.e. at the inside of the turn, expressing this by Vin, a target vehicle wheel speed Vwt is calculated according to the below-mentioned formula 4, and then in step 160, a duty ratio Dr is calculated according to the below-mentioned formula 5, wherein Vout is the vehicle wheel speed of the control vehicle wheel, and Kp and Kd are constant factors for the proportional and integration terms of a feedback control of the vehicle wheel speed.

$$Vwt=(1-Rs)*Vin \qquad (4)$$

$$Dr=Kp*(Vout-Vwt)+Kd*d(Vout-Vwt)/dt \qquad (5)$$

In step 170, a control signal is output for the control valve 40FL or 40FR corresponding to the control vehicle wheel so that the control valve is changed over to said second position, and at the same time the on-off valves 44fl and 46fl or 44fr and 46fr corresponding to the control vehicle wheel are supplied with control signals corresponding to the duty ratio Dr so that a pressure modified from the accumulator pressure is supplied to the wheel cylinder 38FL or 38FR according to the duty ratio Dr, whereby a controlled braking force is applied to the control vehicle wheel.

In more detail, when the duty ratio Dr is between a certain positive standard value and a certain negative standard value, the on-off valve 44FL or 44FR at the upstream side of the wheel cylinder 38FL or 38FR and the on-off valve 46FL or 46FR at the downstream side of the wheel cylinder 38FL or 38FR are both closed so that the pressure of the corresponding wheel cylinder is maintained; when the duty ratio Dr is greater than said positive standard value, the on-off valve 44FL or 44FR is opened while the on-off valve 46FL or 44FR is closed so that the pressure of the corresponding wheel cylinder is increased; and when the duty ratio is smaller than said negative standard value, the on-off valve 44FL or 44FR is closed while the on-off valve 46FL or 46FR is opened so that the pressure of the corresponding wheel cylinder is decreased.

Now, referring to the flowchart shown in FIG. 3, the selection of the maps of FIG. 4, i.e. the variable determination of the current threshold spin value SVc in step 70 will be described. The flowchart of FIG. 3 is carried out as a sub-routine of the main routine shown in FIG. 2.

In step 210, count value C of a timer is incremented by one, and then the control process proceeds to step 230, where the maximum value SVm of the absolute value of the spin value SV is stored, and then in step 240, the absolute value of the spin value SV is integrated to obtain an integration value SVi.

In step 250, it is tested if the spin value SV is zero, i.e. if the behavior control has ended for one time, and if the answer is yes, then the control process proceeds to step 270, whereas if the answer is no, then in step 265, it is tested if the count value C of the timer is greater than a standard value Ce (a positive constant integer), and if the answer is no, the control process returns to Step 10.

In step 270, an integration value SVs of the maximum value of the absolute value of the spin value SV is calculated, the memory of SVm is cleared, and count value N of a counter showing the repetition number of the behavior control is incremented by one.

In step 280, it is tested if the count value C of the timer is greater than the standard value Ce, and if the answer is no, the control process returns to Step 10, whereas if the answer is yes, the control process proceeds to step 290. Also, when the answer of step 265 is yes, the control process proceeds to step 290.

In step 290, it is tested if a count value N of the counter is greater than a higher standard value Nh (a positive constant integer), and if the answer is yes, the control process proceeds to step 300, whereas if the answer is no, the control process proceeds to step 310, where it is further tested if the count value N is less than a lower standard value Nd (a positive constant integer smaller than Nh), and if the answer is yes, the control process proceeds to step 320, whereas if the answer is no, the control process proceeds to step 330. In step 300, the coefficient K1 is set to K1h (a positive constant smaller than 1). In step 330, the factor K1 is set to 1. In step 320, the factor K1 is set to K1d (a positive constant larger than 1). Therefore, by these steps the frequency of operation of the turn behavior control per unit period is detected and a parameter therefor is set by the factor K1. The control of these steps reflects the curving condition of the road upon the self variation of the control performance of the turn behavior control according to the present invention.

In step 340, it is tested if the integration value SVs of the maximum value of the absolute value of the spin value is greater than a threshold value SVe (a positive constant), and if the answer is no, the control process proceeds to step 360, whereas if the answer is yes, then in step 350, a control signal is output to the warning means 64 to warn the driver that the driving condition is such that the turn behavior of the vehicle is liable to instability due to too high vehicle speed for the turn or too quick steering for the vehicle speed. In step 360, the count value C, the count value N and the integration value SVs are all reset to zero.

In step 370, it is tested if the integration value SVi of the absolute value of the spin value is larger than an higher standard value SVih (a positive constant), and if the answer is yes, the control process proceeds to step 380, whereas if the answer is no, the control process proceeds to step 390, and it is further tested if SVi is smaller than a lower standard value SVid, and if the answer is yes, the control process proceeds to step 400, whereas if the answer is no, the control process proceeds to step 410. In step 380, coefficient K2 is set to K2h (a positive constant greater than 1). In step 410, coefficient K2 is set to 1. In step 400 coefficient K2 is set to K2d (a positive constant smaller than 1). Therefore, by these steps the steering skill of the driver is detected from the view point that how great quantity of steering action the driver has made during unit period, and a parameter therefor is set by the factor K2. The control of these steps reflects the steering skill of the driver on the self variation of the control performance of the turn behavior control according to the present invention.

Figure 4:
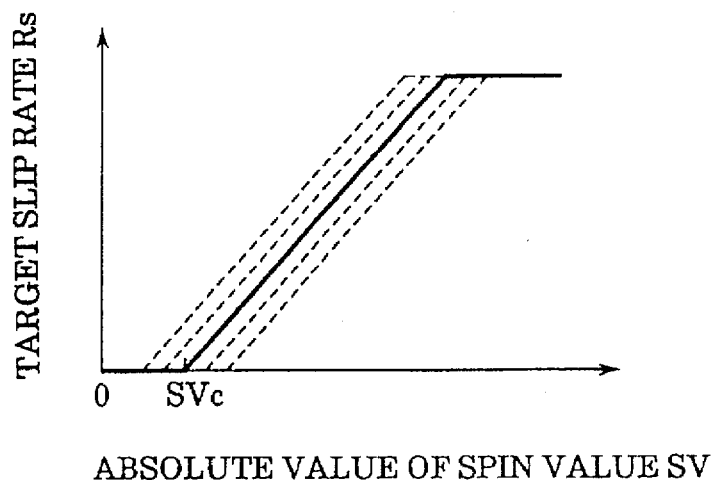
FIG. 4 is a graph showing the map for providing the relationship between the spin value and the target slip rate.

In step 420, the threshold spin value SVc to select one of the maps of FIG. 4 is calculated according to the below-mentioned formula 6, wherein SVco is a positive constant determined such that the threshold spin value SVc becomes an optimum value when the factors K1 and K2 are both 1.

$$SVc = K1 * K2 * SVco \qquad (6)$$

Although the threshold spin value SVc is calculated based upon the product of K1 and K2 in the above, the threshold value SVc may be estimated based upon only K1 or K2, or any other combination of K1 and K2 such as a weighed addition of K1 and K2.

Figure 3:
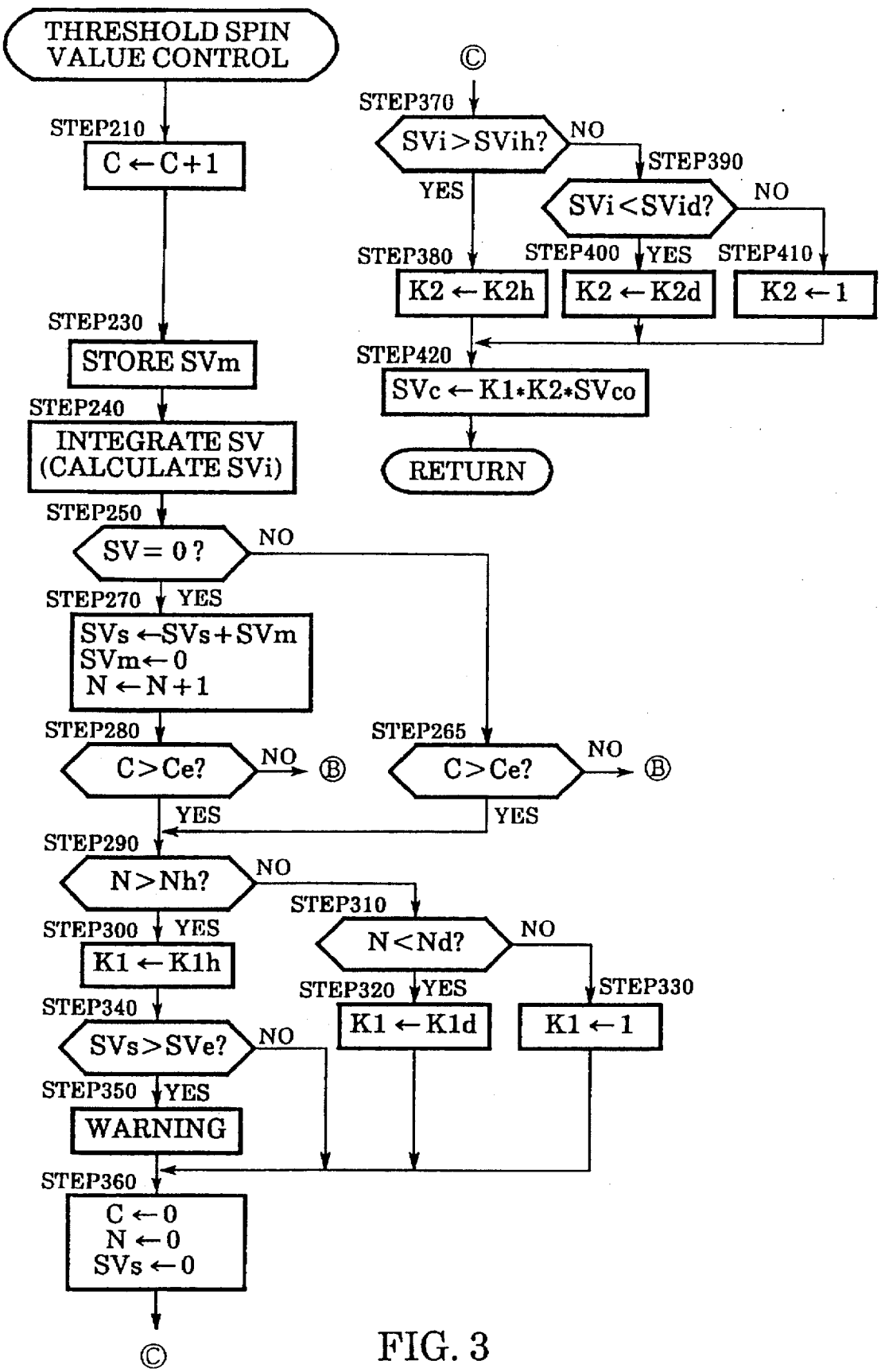
FIG. 3 is a flowchart showing the threshold spin value control routine incorporated as a step of the routine of FIG. 2.

Thus, according to the turn behavior control shown in FIGS. 2 and 3, the threshold spin value SVc which gives the criteria for execution or non-execution of the turn behavior control is varied to be made lower as the frequency of execution of the turn behavior control per unit period increases, by the factor K1 being shifted from K1d larger than 1 toward K1h smaller than 1 through 1 as the count number N increases due to, for example, a many curved road condition, while it is varied to be made higher as the time based integration of the spin value within unit period increase, by the factor K2 being shifted from K2d smaller than 1 toward K2h larger than 1 through 1 as the integration spin value SVi increases due to probably a high skill steering action of the driver.

By the threshold spin value SVc for the next unit period being varied to be lower as the frequency of execution of the turn behavior control during the current unit period is higher, the turn behavior control is started earlier when the turn behavior of the vehicle is going to become unstable during the next unit period, so that, during the next unit period, the stability condition of the vehicle is improved, so that the frequency of execution of the turn behavior control is decreased. In this manner, the balance between the degree of stabilization of the vehicle and the frequency of execution of the turn behavior control is optimized with respect to each varying road condition or the like.

On the other hand, by the threshold spin value SVc for the next unit period being varied to be higher as the integration value of the spin value during the current unit period is higher, the turn behavior control is started later when the turn behavior of the vehicle is going to become unstable during the next unit period, so that, during the next unit period, the stability condition of the vehicle is more entrusted to the driver who was estimated to have a high skill of steering such as to operate the steering wheel at higher frequency, so that the frequency of execution of the turn behavior control is decreased inversely proportionally to the level of the driver's skill. In this manner, the balance between the degree of stabilization of the vehicle and the frequency of execution of the turn behavior control is optimized with respect to each varying steering skill of the driver.

Further, according to the shown embodiment, the maximum value SVm of the absolute value of the spin value SV is stored in step 230 and is integrated in step 270 to generate the integration value SVs of the maximum value of the absolute value of the spin value, and when this value exceeds a determinate limit value SVe, to the driver is warned in step 350. Therefore, when the turn driving condition is too close to causing undesirable instability of the vehicle, the driver is warned, suggesting to him or her to modify his or her turning operation to a more stabilizing manner.

Further, it will be noted that in step 130 the target slip rate Rs is modified to be decreased in accordance with the magnitude of the differentiation value SVd (negative), while in step 140 the target slip rate Rs is modified to increase in accordance with the magnitude of the differentiation value SVd.

By this arrangement, when the spin value is growing a sufficiently large anti-spin moment is generated, so that the turn behavior is effectively controlled to stabilize, while if the spin value is subsiding it is avoided that an excessively large anti-spin moment is generated, whereby it is effectively avoided that the turn behavior of the vehicle becomes unstable at the end of the behavior control due to the inertial action of the large anti-spin moment.

Figure 5:
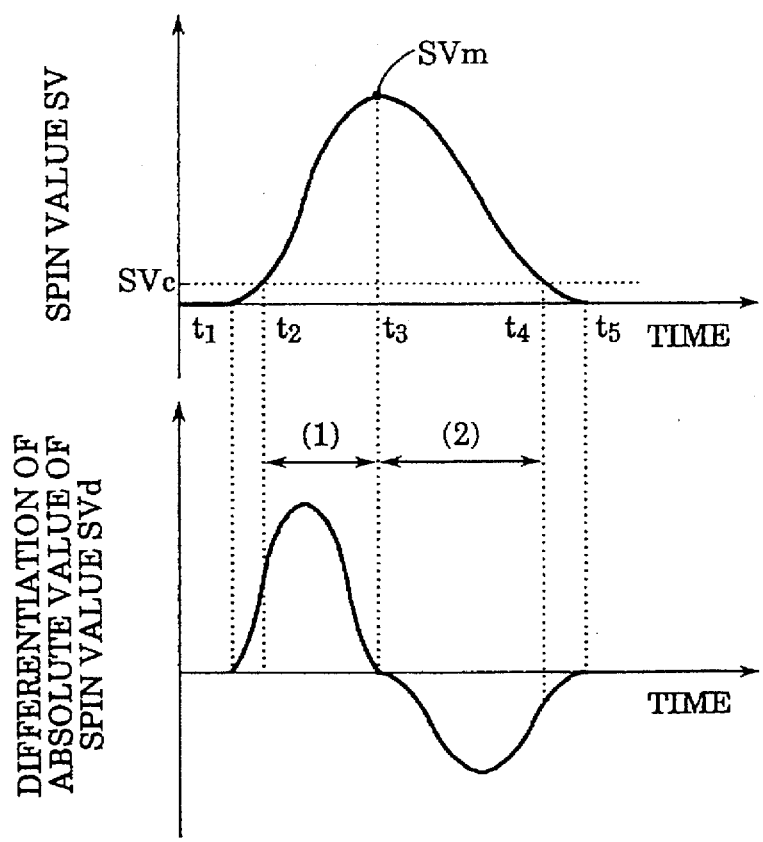
FIG. 5 is a graph showing an example of time based change of the spin value and the differentiation spin value corresponding thereto.

When, for example, the spin value SV changes as shown in FIG. 5, top part, so that thereby the differentiation value SVd changes as shown in FIG. 5, bottom part, between point $t_2$ and time point $t_4$ the flag F is set to 1, and the behavior control is carried out. In this case, in period (1) between time point $t_2$ and time $t_3$ the differentiation value SVd of the absolute value of the spin value is positive, whereby the target slip rate Rs is modified as shown by curve (1) of FIG. 6 to become greater than the mapped value (dot-dash line), and then in period (2) between time points $t_3$ and $t_4$ the differentiation value SVd is negative, whereby the target slip rate Rs is modified as shown by curve (2) in FIG. 6 to become smaller than the mapped value.

Therefore, the target slip rate Rs in this embodiment is calculated as if it is calculated from a map incorporating a hysterisis characteristic of changing a modification amount according to increase and decrease of the absolute value of the spin value SV.

Figure 7:
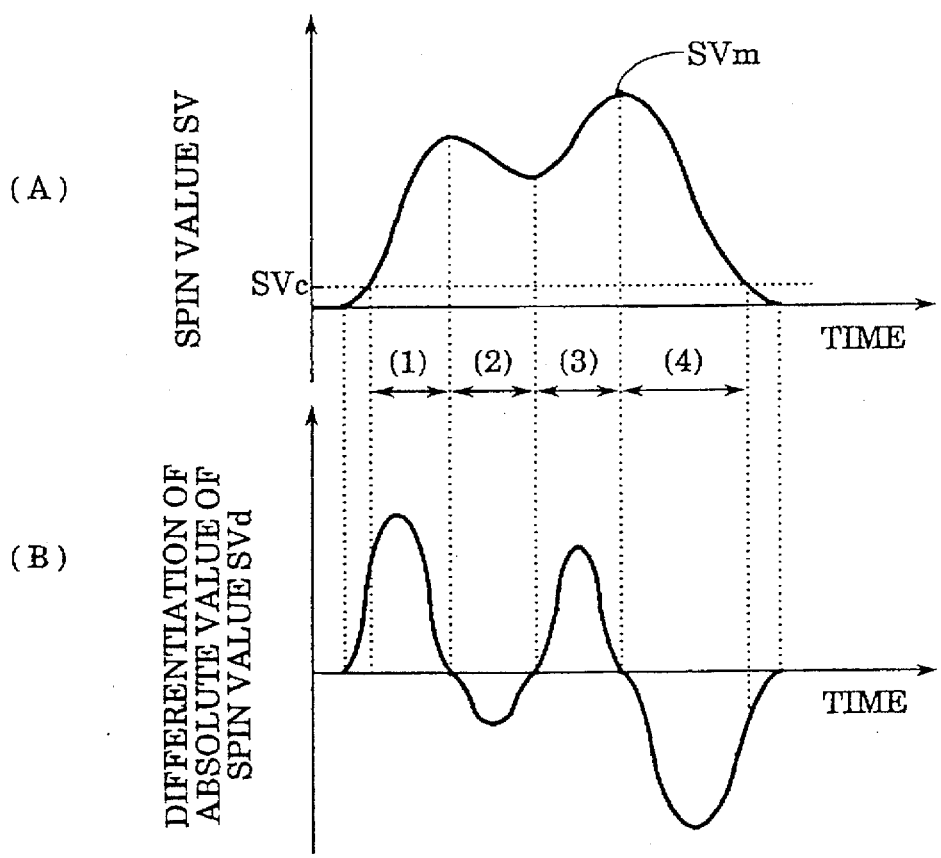
FIG. 7 is a graph showing another example of time based change of the spin value and the differentiation spin value corresponding thereto.
Figure 8:
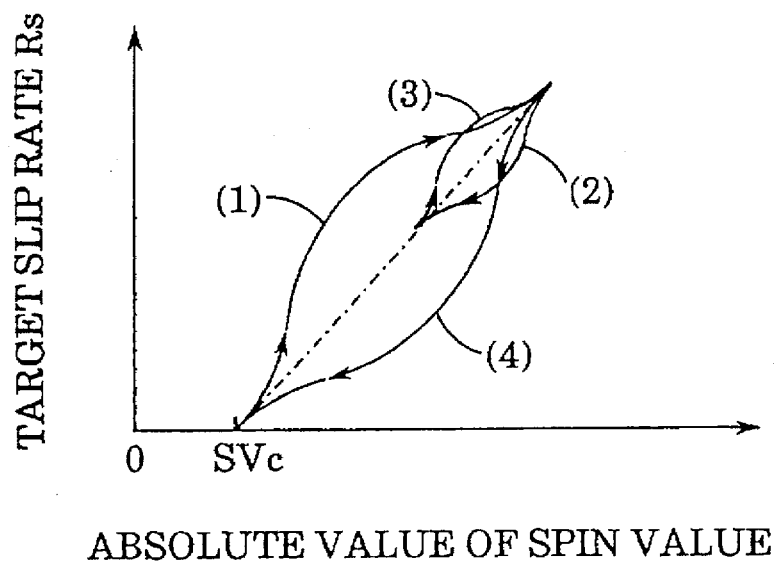
FIG. 8 is a graph showing another example of modifications of the relationship between the spin value and the target slip rate according to the differentiation spin value.

When the spin value SV changes as shown in FIG. 7, top part with a lapse of time due to changes of the friction coefficient of the road surface during a turn driving, so that thereby the differentiation value SVd changes as shown in FIG. 7, bottom part, the target slip rate Rs is modified to increase in periods (1) and (3) where the differentiation value SVd is positive, while the target slip rate Rs is modified to decrease in periods (2) and (4) where the differentiation value SVd is negative, so that in this case also the target slip rate Rs is calculated as if it is calculated from a map incorporating a hysterisis characteristic as shown in FIG. 8. In any event, the control of these steps reflects the surface condition of the road upon the self variation of the control performance of the turn behavior control according to the present invention.

Figure 9:
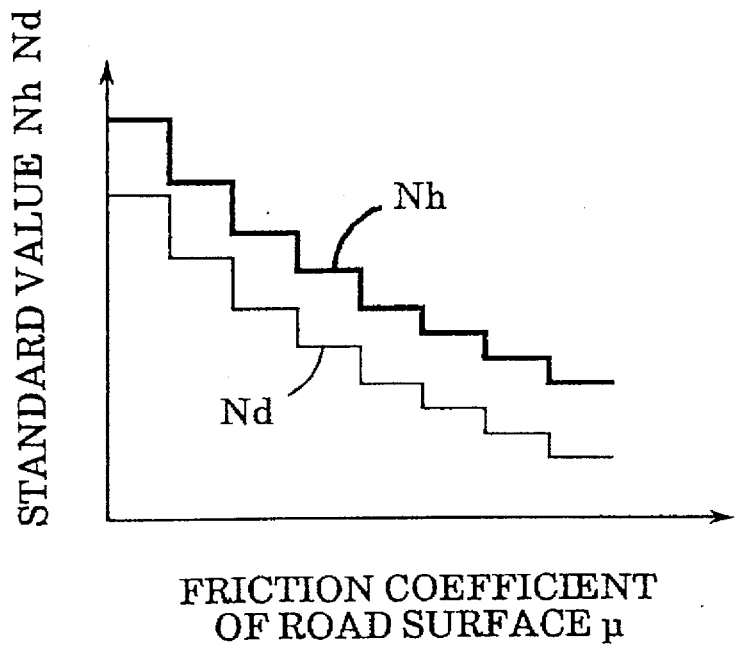
FIG. 9 is a graph showing an example of modification of the standard values Nh and Nd according to the friction coefficient μ of road surface.

In the shown embodiment, the standard values Nh and Nd in steps 290 and 310 and the standard values SVih and SVid in steps 370 and 390 are constant values. However, the turn behavior of the vehicle is more apt to become unstable as the friction coefficient μ of the road surface is lower. Therefore, the standard values Nh and Nd may be variably set according to the friction coefficient so that they are set lower as the friction coefficient μ of the road surface increases as shown in FIG. 9, wherein the friction coefficient μ of the road surface may be estimated based upon lateral acceleration Gy of the vehicle body or a vector sum of longitudinal and lateral accelerations of the vehicle body Gx and Gy, i.e. $(Gx^2+Gy^2)^{1/2}$. The standard values SVih and SVid may also be variably set according to the friction coefficient of the road surface so that they are set lower as the friction coefficient of the road surface is lower, by estimating the friction coefficient of the road surface.

With respect to the coefficients K1 and K2, upper and lower limits may be set, so that they are not too large or too small, and when the coefficient K1 or K2 would become smaller than a lower limit, it is set to the lower limit, while when the coefficient K1 or K2 would become larger than an upper limit, it is set to the upper limit. Further upper and lower limits may be set for the product of the coefficients K1*K2.

Although the present invention has been described in detail with respect to a particular embodiment thereof, it will be apparent for those skilled in the art that various modifications are possible with respect to the shown embodiment within the scope of the present invention.

We claim:

1. A turn behavior control system of a vehicle having front left, front right, rear left and rear right wheel cylinders for respectively independently braking front left, front right, rear left, and rear right wheels thereof, comprising:

means for estimating a spinning condition of the vehicle based upon at least one operation parameter of the vehicle to generate a spin parameter;

means for generating an anti-spin moment in the vehicle by relative operation of the front left, front right, rear left and rear right wheel cylinders; and means for controlling said anti-spin moment generation means according to said spin parameter, wherein said control means starts operation of said anti-spin moment generation means when said spin parameter exceeds a threshold value therefor, with reviewing said threshold value at each unit period to be lowered as frequency of operation of said anti-spin moment generating means during a preceding unit period increases.

2. The turn behavior control system according to claim 1, wherein said control means reviews said threshold value to each unit period to be raised as the frequency of operation of said anti-spin moment generation means during a preceding unit period decreases.

3. The turn behavior control system according to claim 1, wherein said control means integrates a maximum value of absolute values of said spin parameter at each operation of said turn behavior control during each unit period, and despatches a signal for warning when an integrated value exceeds a determinate standard value.

4. A turn behavior control system of a vehicle having front left, front right, rear left and rear right wheel cylinders for respectively independently braking front left, front right, rear left, and rear right vehicle wheels thereof, comprising:

means for estimating a spinning condition of the vehicle based upon at least one operation parameter of the vehicle to generate a spin parameter;

means for generating an anti-spin moment in the vehicle by relative operation of the front left, front right, rear left and rear right wheel cylinders; and means for controlling said anti-spin moment generation means according to said spin parameter, wherein said control means starts operation of said anti-spin moment generation means when said spin parameter exceeds a threshold value therefor, with reviewing said threshold value at each unit period to be raised as an integration value of an absolute value of said spin parameter during a preceding unit period increases.

5. The turn behavior control system according to claim 4, wherein, said control means reviews said threshold value at each unit period to be lowered as an integration value of the absolute value of said spin parameter during a preceding unit period decreases.

6. A turn behavior control system of a vehicle having front left, front right, rear left and rear right wheel cylinders for respectively independently braking front left, front right, rear left, and rear right wheels thereof, comprising:

means for estimating a spinning condition of the vehicle based upon at least one operation parameter of the vehicle to generate a spin parameter;

means for generating an anti-spin moment in the vehicle by relative operation of the front left, front right, rear left and rear right wheel cylinders; and means for controlling said anti-spin moment generation means according to said spin parameter, wherein said control means controls operation of said anti-spin moment generation means so as to magnify a generation of said anti-spin moment according to an increasing rate of said spin parameter.

7. The turn behavior control system according to claim 6, wherein, said control means controls the operation of said anti-spin moment generation means so as to attenuate the generation of said anti-spin moment according to a decreasing rate of said spin parameter.

* * * * *